US012561997B2

(12) United States Patent
Singhal et al.

(10) Patent No.: US 12,561,997 B2
(45) Date of Patent: Feb. 24, 2026

(54) CONTEXT-BASED REVIEW TRANSLATION

(71) Applicant: ADOBE INC., San Jose, CA (US)

(72) Inventors: Gourav Singhal, Delhi (IN); Amol Jindal, San Jose, CA (US)

(73) Assignee: ADOBE INC., San Jose, CA (US)

( * ) Notice: Subject to any disclaimer, the term of this patent is extended or adjusted under 35 U.S.C. 154(b) by 658 days.

(21) Appl. No.: 17/857,416

(22) Filed: Jul. 5, 2022

(65) Prior Publication Data

US 2024/0013561 A1 Jan. 11, 2024

(51) Int. Cl.
| | |
|---|---|
| *G06V 30/18* | (2022.01) |
| *G06F 40/279* | (2020.01) |
| *G06F 40/58* | (2020.01) |
| *G06V 20/40* | (2022.01) |
| *G06V 20/62* | (2022.01) |

(52) U.S. Cl.
CPC ...... *G06V 30/18143* (2022.01); *G06F 40/279* (2020.01); *G06F 40/58* (2020.01); *G06V 20/46* (2022.01); *G06V 20/63* (2022.01)

(58) Field of Classification Search
CPC .. G06V 30/18143; G06V 20/46; G06V 20/63; G06F 40/279; G06F 40/58
See application file for complete search history.

(56) References Cited

U.S. PATENT DOCUMENTS

| | | | | |
|---|---|---|---|---|
| 11,449,686 B1 * | 9/2022 | Panchal | .................. | G06F 40/51 |
| 2008/0195372 A1 * | 8/2008 | Chin | ........................ | G06F 40/58 |
| | | | | 704/2 |

| | | | | |
|---|---|---|---|---|
| 2009/0234878 A1 * | 9/2009 | Herz | .................... | H04N 21/252 |
| | | | | 707/999.102 |
| 2011/0143811 A1 * | 6/2011 | Rodriguez | ......... | H04N 1/00244 |
| | | | | 455/556.1 |
| 2016/0147738 A1 * | 5/2016 | Geurts | .................... | G06F 40/47 |
| | | | | 704/2 |
| 2020/0349235 A1 * | 11/2020 | Siwek | ................. | G06F 11/3664 |
| 2021/0124789 A1 * | 4/2021 | Travieso | ................. | G06F 40/45 |
| 2021/0141867 A1 * | 5/2021 | Wason | .................... | G06V 10/82 |
| 2021/0165973 A1 * | 6/2021 | Kofman | ................. | G06F 40/30 |
| 2021/0224490 A1 * | 7/2021 | Guo | ........................ | G06F 40/58 |
| 2022/0284058 A1 * | 9/2022 | Hazra | ............... | G06F 16/90324 |

FOREIGN PATENT DOCUMENTS

| | | | | |
|---|---|---|---|---|
| WO | WO2016147383 | * | 9/2016 | |
| WO | WO2016147383 A1 * | | 9/2016 | |
| WO | WO-2017186650 A1 * | 11/2017 | ........... | G06F 17/289 |

* cited by examiner

*Primary Examiner* — Qun Shen

(74) *Attorney, Agent, or Firm* — Shook Hardy & Bacon L.L.P.

(57) ABSTRACT

A translation system provides machine translations of review texts on item pages using context from the item pages outside of the review text being translated. Given review text from an item page, context for machine translating the review text is determined from the item page. In some aspects, one or more keywords are determined based on text, images, and/or videos on the item page. The one or more keywords are used as context by the machine translator to translate the review text from a first language to a second language to provide translated review text, which can be presented on the item page.

20 Claims, 9 Drawing Sheets

502

RECEIVE INPUT REVIEW TEXT FROM ITEM PAGE

504

DETERMINE ONE OR MORE KEYWORDS FROM PORTION OF ITEM PAGE OUTSIDE OF REVIEW TEXT

506

MACHINE TRANSLATE INPUT REVIEW TEXT FROM FIRST LANGUAGE TO SECOND LANGUAGE USING KEYWORD(S) AS CONTEXT

508

PROVIDE TRANSLATED REVIEW TEXT FOR PRESENTATION

500

600

602

RECEIVE TEXT FROM ITEM PAGE OUTSIDE OF REVIEW TEXT BEING TRANSLATED

604

IDENTIFY IMPORTANT WORD(S) FROM TEXT

606

DESIGNATE IMPORTANT WORD IDENTIFIED FROM TEXT AS KEYWORD

802

RECEIVE VIDEO FROM ITEM PAGE

804

IDENTIFY FRAME(S) OF VIDEO

806

USE OBJECT DETECTOR TO IDENTIFY AND LABEL OBJECT IN EACH FRAME

808

DESIGNATE LABEL FOR OBJECT AS KEYWORD

800

CONTEXT-BASED REVIEW TRANSLATION

BACKGROUND

The past few decades have seen a paradigm shift away from "brick and mortar" stores toward online shopping at e-commerce sites. Virtually every company that offers products or services has an online presence via a website that allows customers to view and purchase items being offered. One aspect of online shopping is user generated reviews. In particular, e-commerce sites typically allow for users to submit reviews for items, and the reviews are presented on corresponding item pages published by the e-commerce sites. Given the ubiquitous nature of the Internet, visitors to some e-commerce sites are globally dispersed. As a result, visitors to a website may wish to read reviews that are in a foreign language. Additionally, reviews are increasingly being submitted by users in different languages.

SUMMARY

Embodiments of the present technology relate to, among other things, a translation system that performs machine translation of review text using context from an item page outside of the review text itself. Given an input review text from an item page, the translation system determines context to facilitate translating the review text from a first language to a second language. In some aspects, the translation system determines one or more keywords from portions of the item page, such as, for instance, text from the item page outside of the review text being translated, images on the item page, and/or videos on the item page. Using the one or more keywords as context, a machine translator (e.g., a deep neural encoder-decoder network) translates the input review text from the first language to the second language to provide translated review text. The translated review text in the second language can be provided for presentation, for instance, on the item page.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Definitions

Figure 1:
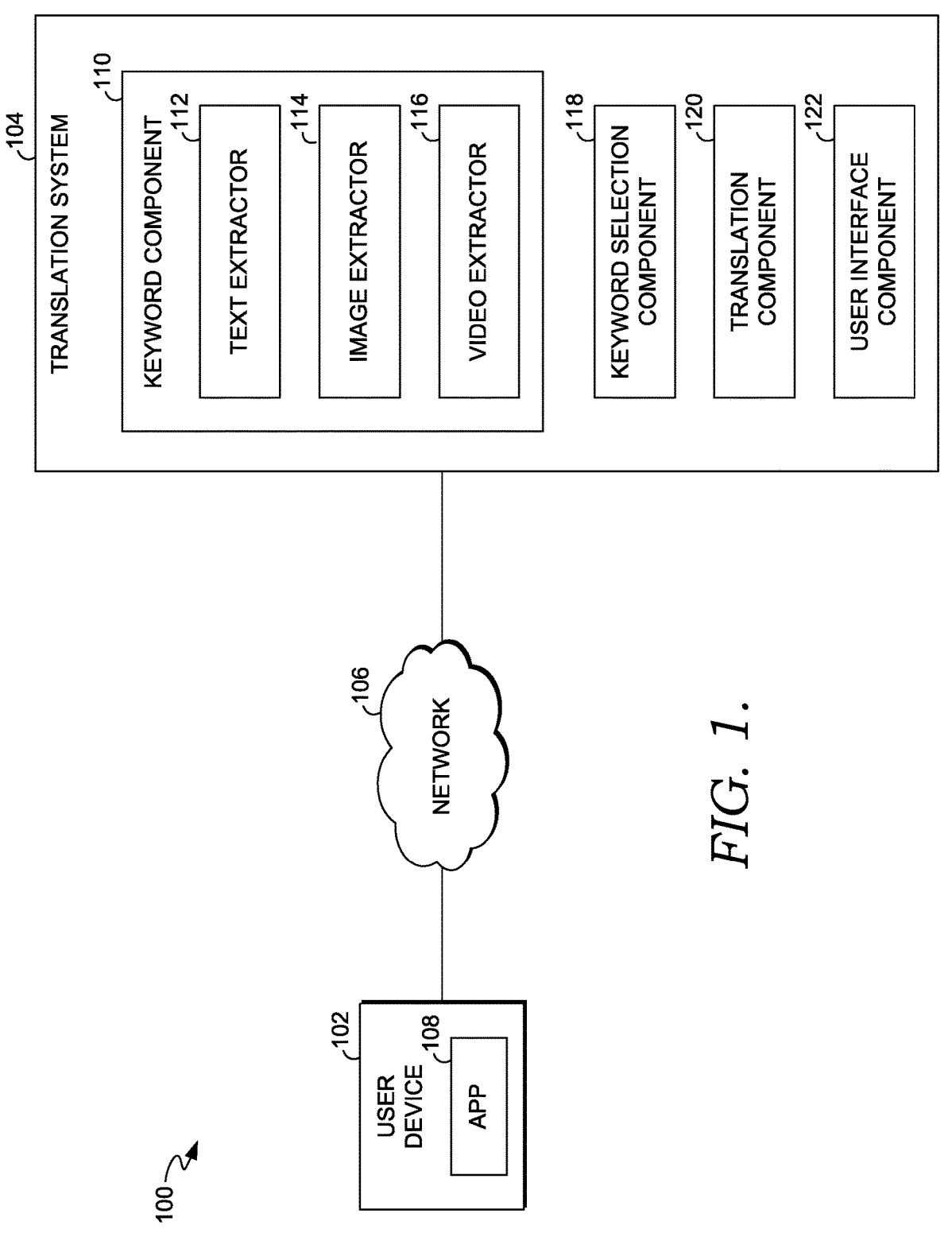
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "user generated review" refers to a review submitted by a user for presentation on an item page.

The term "review text" refers to text included as part of a user generated review on an item page.

An "item page" refers to a web page providing information for an item. An item page, can include, among other things, a title identifying the item, a textual description of the item, an image of the item, a video of the item, and one or more reviews submitted by users regarding the item. An item page can be provided, for instance, by a listing platform that provides items available for purchase, rental, streaming, etc. An "item" can comprise, for instance, a physical product, digital content, or a service.

As used herein, "translated review text" comprises review text that has been machine translated to a language different from the language of the original review text. For instance, an original review text could be in English, while the translated review text could be in Hindi.

"Context" refers to information used by a machine translator to translate text from one language to another language. In some aspects of the technology describe herein, context for translating review text is based on information available on an item page outside of the review text being translated. The context can be derived from various portions of the item page. In accordance with some aspects of the technology described herein, context is derived from text on an item page outside of the review text being translated, such as for instance, text from an item title and an item description on the item page. In some aspects, context is derived from images and/or videos provided on the item page.

As used herein, a "keyword" comprises a single word or a multi-word phrase identified based on context of an item page. In accordance with some aspects, one or more keywords are identified based on text of an item page outside of the review text being translated, images on an item page, and/or videos on an item page.

Overview

To address the issue of users submitting reviews and wishing to consume reviews with text in different languages, some conventional e-commerce sites employ machine translation to translate review text from one language to another. Some e-commerce systems automatically machine translate any review text submitted in a foreign language to the language of the item page. For instance, if a user submits review text in Spanish to an item page in English, the e-commerce system machine translates the review text to English and includes the English version on the item page. In some cases, machine translation of review text is performed automatically based on a visitor's geolocation. For instance, when a visitor located in Mexico accesses an item page with review text in English, some e-commerce systems automatically machine translate the text to Spanish. In some instances, an e-commerce system provides item pages with user interface elements that allow users to select to have text machine translated to another language. When an e-commerce site does not provide any machine translation services, users often use third-party machine translators to translate the text.

Current machine translation technologies have limitations that sometimes result in inaccurate translations. For instance, some words have multiple meanings, forcing the machine translator to select a particular meaning, which is inevitably incorrect in some cases. By way of example to illustrate, suppose a user generated review on an item page for a t-shirt includes the text: "This has tears!!!" The word "tears" could refer to holes or splits in something or could refer to drops from a person's eye. When the machine translator receives the review text, it could incorrectly translate the text to Hindi as: "टी-शर्ट म आंसू थे".. In English, आंसू means—water drops (eye tears) in eyes. As can be understood from this example, this translation is incorrect and is not what was intended by the reviewer. Some machine translators use other terms from the text being translated to help determine a particular translation for a term from multiple alternatives. One shortcoming of this approach is that review texts are often short or otherwise do not provide enough text to result in accurate translations.

Embodiments of the present technology solve these problems by providing a translation system that uses context from an item page outside of review text being translated when machine translating the review text from a first language to a second language.

In accordance with some aspects of the technology described herein, input review text for an item page is received for machine translation from a first language to a second language. Context from the item page outside of the input review text being translated is obtained to facilitate the machine translation of the input review text. The context can be derived from different portions of the item page.

In some instances, the context comprises keywords identified from text on the item page outside of the review text, such as a title of an item offered by the item page or a description of the item. More particularly, text from the item page outside of the review text is analyzed (e.g., using TF-IDF or other techniques) to identify important words, which are designated as keywords. In some instances, the context comprises keywords identified based on analysis of images and/or videos provided on the item page. More particularly, an image or a frame of a video is analyzed using object recognition techniques (e.g., using a machine learning-based LSTM-CNN (long short-term memory convolutional neural network) supervised model) to identify and label an object in the image/frame, and the label is designated as a keyword. In some cases, keywords identified from text on an item page, images, and/or videos are processed to remove keywords that could be considered noise as they are not relevant to the item of the item page.

Given the input review text and the keywords derived from the item page as context outside of the input review text, a machine translator (e.g., a conditional deep neural encoder-decoder model) translates the input review text from a first language to a second language to provide translated review text. The machine translator effectively uses the keywords as context when translating the input review text from the first language to the second language.

The technology described herein provides a number of advantages over existing approaches. For instance, aspects of the technology described herein allow for more accurate machine translations of review text than that provided by conventional approaches. The technology can provide accurate translations even when the review text being translated is very short and does not provide much, if any, additional information for accurately translating certain terms. For instance, consider the example above in which an item page for a t-shirt includes a user generated review with the review text: "This has tears! ! !" In this case, the review text provides no information for accurately translating "tears." By leveraging context from the item page outside of the review text, the technology described herein selects a translation for "tears" that accurately reflects the intended meaning of the term.

Example System for Context-Based Review Translation

With reference now to the drawings, FIG. 1 is a block diagram illustrating an exemplary system 100 for context-based review translation in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and translation system 104. Each of the user device 102 and translation system 104 shown in FIG. 1 can comprise one or more computer devices, such as the computing device 900 of FIG. 9, discussed below. As shown in FIG. 1, the user device 102 and the translation system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and translation systems can be employed within the system 100 within the scope of the present technology. Each can comprise a single device or multiple devices cooperating in a distributed environment. For instance, the translation system 104 could be provided by multiple server devices collectively providing the functionality of the translation system 104 as described herein. Additionally, other components not shown can also be included within the network environment.

Figure 2:
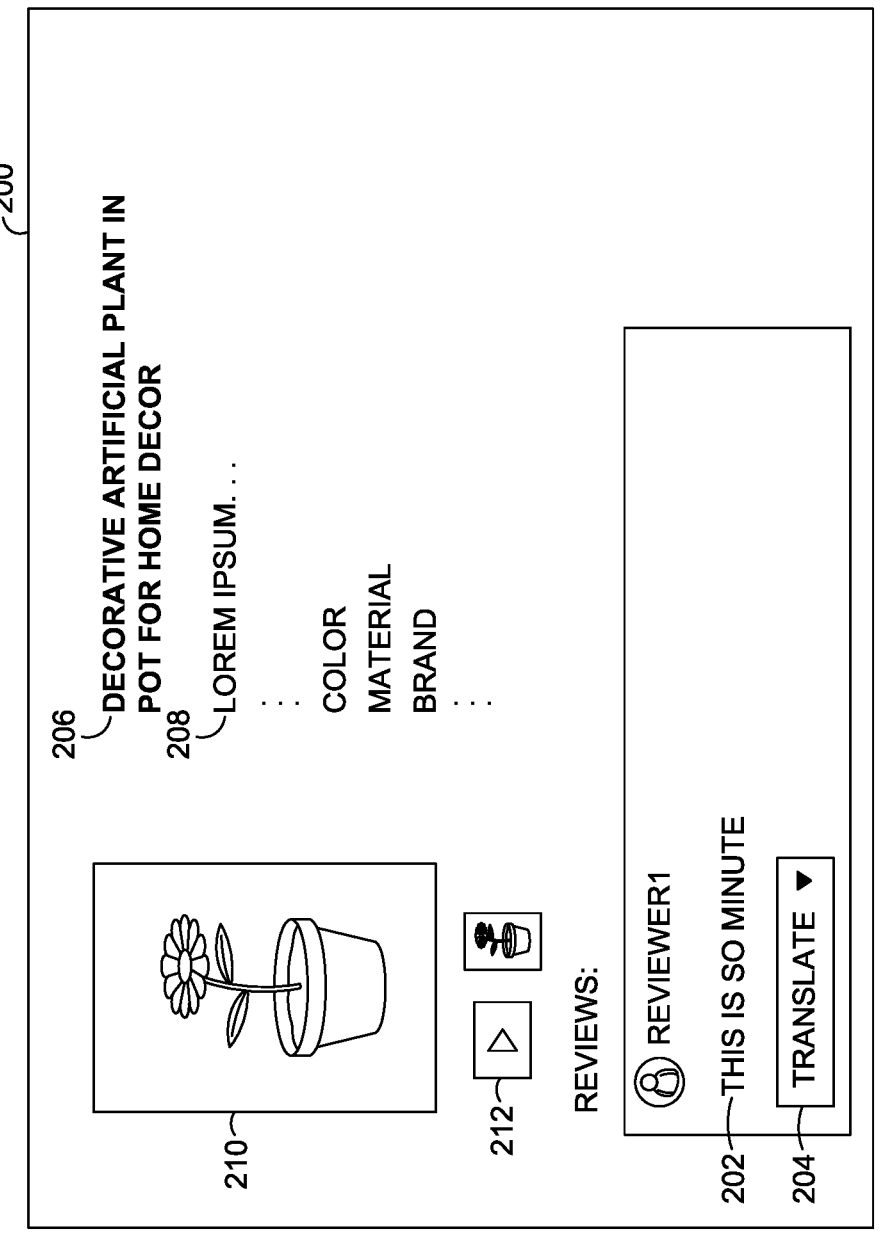
FIG. 2 is a diagram showing an example item page with review text to be translated in accordance with some implementations of the present disclosure.

At a high level, the translation system 104 translates review text on an item page from one language to another language using context from the item page outside the review text being translated. By way of example, FIG. 2 illustrates an item page 200 with review text 202 in English and an option 204 for translating the review text 202 into another language. As shown in FIG. 2, the item page 200 includes portions outside of the review text 202 from which context is extracted by aspects of the technology described herein for translating the review text 202, including an item title 206, an item description 208, an image 210, and a video 212. It should be understood that the portions of the item page 200 from which context can be extracted are provided by way of example only and not limitation, and an item page may not include all the portions shown in FIG. 2 and/or can have additional portions from which context can be extracted.

Returning to FIG. 1, the translation system 104 includes a keyword component 110 (including a text extractor 112, an image extractor 114, a video extractor 116), a keyword selection component 118, a translation component 120, and a user interface component 122. These components can be in addition to other components that provide further additional functions beyond the features described herein. The translation system 104 can be implemented using one or more server devices, one or more platforms with corresponding application programming interfaces, cloud infrastructure, and the like. While the translation system 104 is shown separate from the user device 102 in the configuration of FIG. 1, it should be understood that in other configurations, some or all of the functions of the translation system 104 can be provided on the user device 102. For instance, while FIG. 1 shows a networked environment, some configurations can implement all functions locally on the user device 102.

The keyword component 110 identifies keywords from content of an item page outside of the review text being translated such that the keywords can be used as context for translating the review text. The content of the item page from which the keywords can be identified by the keyword component 110 includes, for instance, text outside of the review text being translated, images, and videos on the item page. As shown in FIG. 1, the keyword component 110 includes a text extractor 112, an image extractor 114, and a video extractor 116.

The text extractor 112 identifies keywords from text on an item page outside of the review text being translated. Each keyword identified by the text extraction module can be a single word or a phrase. For simplification purposes, each of the terms "keyword" and "word" is used herein to encompass both a single word and a multi-word phrase. The text extractor 112 identifies the keywords from text located at any portion of the item page outside of the review text being translated, such as, for instance, the item title and the description of the item on the item page. For instance, in FIG. 2, the item page 200 includes an item title 206 and an item description 208, in addition to the review text 202 being translated The text extractor 112 extracts text from the item page and identifies keywords from the extracted text. The text extractor 112 can identify keywords from text extracted from an item page using any of a variety of techniques that analyze text and automatically identify the most important words in the text. Important words in text are words that occur most frequently in the text and/or have the most relevance to conveying the context of the text.

By way of example only and not limitation, in some configurations, the text extractor 112 employs term frequency-inverse document frequency (TF-IDF) to assess the importance of words in the extracted text to identify keywords. A TF-IDF score for a word from text extracted from an item page represents the importance of the word in the extracted text. The text extractor 112 can compute the TF-IDF score for a word as follows:

$$TF\text{-}IDF = word\_frequency/total\_words$$

where word_frequency is the number of times the word appears in the text and total_words is the total number of words in the text.

The text extractor 112 can select keywords based on the TF-IDF scores of words from the extracted text. For instance, the text extractor 112 can selected the top N words having the highest TF-IDF scores or each word having a TF-IDF score above a threshold value. In some cases, the extracted text is pre-processed before generating TF-IDF scores. For instance, stop word filtering can be performed to remove irrelevant words that appear frequently in the extracted text (e.g., "a", "the", "is", "are", etc.). Stemming can also be performed to transform words to a root form such that different forms of a word can be treated as the same word.

While the description above discusses TF-IDF as one approach for identifying keywords from extracted text from an item page, it should be understood that the text extractor 112 can use other approaches for identifying important words from text as keywords. For instance, the text extractor 112 can use machine learning and/or natural language processing techniques to analyze extracted text from an item page and identify important words as keywords, such as, for instance, the RAKE (Rapid Automatic Keyword Extraction) algorithm, the TextRank algorithm, Support Vector Machines (SVM), Conditional Random Fields (CRF), deep neural networks, and other approaches.

The image extractor 114 identifies keywords based on images on an item page. For instance, the item page 200 of FIG. 2 includes an image 210 that can be analyzed to identify one or more keywords. While FIG. 2 illustrates an image 210 associated with the item (e.g., provided as part of the description of the item), any image included as part of the item page 200, such as images uploaded by users (e.g., as part of reviews), can be analyzed.

Returning to FIG. 1, the image extractor 114 can identify one or more keywords from an image using any of a variety of image processing techniques. In some configurations, the image extractor 114 identifies objects in images and labels each object using object recognition techniques. The object labels are identified as keywords. For instance, the image extractor 114 can analyze an image using a machine learning-based LSTM-CNN (long short-term memory convolutional neural network) supervised model to identify and label objects in images. Such a model can be trained using a set of images of labeled objects (e.g., the ImageNet dataset of images) and allows for additional training on images of further objects to allow the model to identify new objects. It should be noted that a LSTM-CNN model is provided by way of example only and not limitation and other object recognition techniques can be employed.

The video extractor 116 identifies keywords based on videos on an item page. For instance, the item page 200 of FIG. 2 includes a video 212 that can be analyzed to identify one or more keywords. While FIG. 2 illustrates a video 212 associated with the item (e.g., provided as part of the description of the item), any video provided as part of the item page 200, such as videos uploaded by users (e.g., as part of reviews), can be analyzed.

With reference again to FIG. 1, the video extractor 116 identifies and labels objects from frames of a video, and the labels are identified as keywords. Given one or more frames of a video, the video extractor 116 identifies and labels objects from the frame of the video similar to the identification and labelling of objects from images performed by the image extractor 114.

In some configurations, the video extractor 116 selects certain frames from a video for performing object recognition on the selected frames. For instance, the video extractor 116 can extract certain frames from a video by dividing the video into k sections of n seconds each. The video extractor 116 can scan through the frames in the video to select certain frames from buckets (i.e., groupings of frames) corresponding to scenes in the video.

For each frame, the video extractor 116 can find features in the current frame (CO. The features can be identified using a feature detector such as, for instance, the ORB feature detector. The ORB feature detector is a fusion of FAST key point detector and BRIEF descriptor with modifications to enhance performance. The ORB feature detector uses FAST to find key points, then applies the Harris corner measure to find the top N key points among them. It also uses an image pyramid to produce multiscale-features. The ORB feature detector provides real-time performance and high accuracy when matching features from one frame to another. However, it should be understood that the video extractor 116 can use other feature detection techniques.

The features from the current frame, Cf, are matched to features from the previous frame (PO. If the number of features matched is less than a threshold, then temporarily the current frame is marked as a new scene start frame. This is cross verified with the next few frames and only put into another bucket if this holds for the next "K" frames as well.

Processing the frames in this matter provides a number of major scene buckets: Sli={Pi→Pe} for each scene i. A frame from each bucket is selected (e.g., as a representative frame for the scene) and analyzed by the video extractor 116 to identify and label objects in the frame (e.g., using techniques similar to those discussed above for the image extractor 114).

The text extractor 112, image extractor 114, and video extractor 116 provide a collection of potential keywords for use in translating review text on an item page. However, the keywords can include some noise—i.e., keywords that are not relevant to the item. For instance, an image on the item page or a frame from a video on the item page can include background objects that are not related to the item. The keyword selection component 118 removes irrelevant keywords from the collection of potential keywords, thereby removing noise and providing a set of relevant keywords. The keyword selection component 118 can use a variety of different techniques for identifying and removing irrelevant keywords. For instance, in some configurations, the keyword selection component uses the NLTK lib similarity score method to determine a relevance score for each keyword as follows:

nitk_nitk=new nitk( )
relevance score=_nitk.similarity_score(word1, word2)

This will give a relevance score between 0 and 1 where 0 indicates that the words are not similar and 1 means that the words are closely similar. In some configurations, each keyword is compared against an item name for the item presented by the item page such that the relevance score for each keyword reflects a relevance of the keyword to the item name. Keywords having a relevance score below a threshold are removed, thereby providing a final set of keywords for use in translating the review text.

The translation component 120 employs machine translation to translate review text on an item page from one language to another language using context outside of the review text being translated. The context used by the translation component 120 includes keywords from text, images, and/or videos on the item page as identified by the text extractor 112, image extractor 114, and/or the video extractor 116, and as filtered by the keyword selection component 118, as appropriate.

The translation component 120 can use any of a variety of machine translation techniques to translate review text from one language to another language, including neural network models. By way of example and not limitation, in some aspects, the translation component 120 uses a conditional deep neural encoder-decoder model to translate review text. For instance, the translation component 120 could use a seq2seq model, which is an encoder-decoder based model using a neural network (i.e., a recurrent neural network; RNN). Such a model takes review text to be translated as a sequence input. Using keywords from outside that review text as context, the encoder portion of the model encodes the review text in a first language to an embedding space, and the decoder portion produces translated text in a second language, which can be provided as output.

Figure 3:
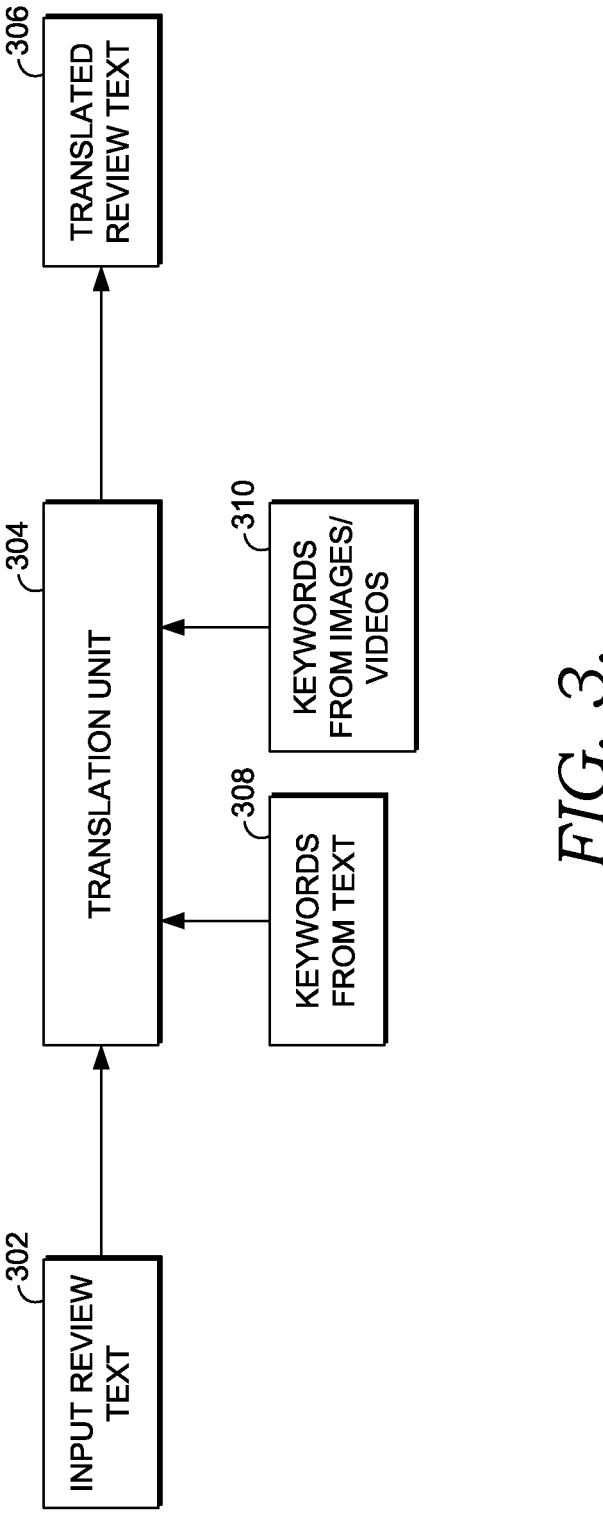
FIG. 3 is diagram showing a translation unit translating input review text in a first language to translated review text in a second language in accordance with some implementations of the present disclosure.

By way of illustration, FIG. 3 shows a diagram in which a translation unit 304 (which can be similar to the translation component 120 of FIG. 1) translates input review text 302 to translated review text 306. The input review text 302 is in a first language and is accessed from an item page on which the input review text 302 is presented. The translated review text 306 is in a second language different from the first language and can be provided for presentation when a user selects to translate the input review text 302.

As shown in FIG. 3, in addition to the input review text 302, the translation unit 304 receives keywords 308 from text on the item page outside of the input review text 302 being translated. The translation unit 304 also receives keywords 310 from images/videos on the item page. The keywords 308 and 310 are used as context to translate the input review text 302 and provide the translated review text 306.

Figure 4:
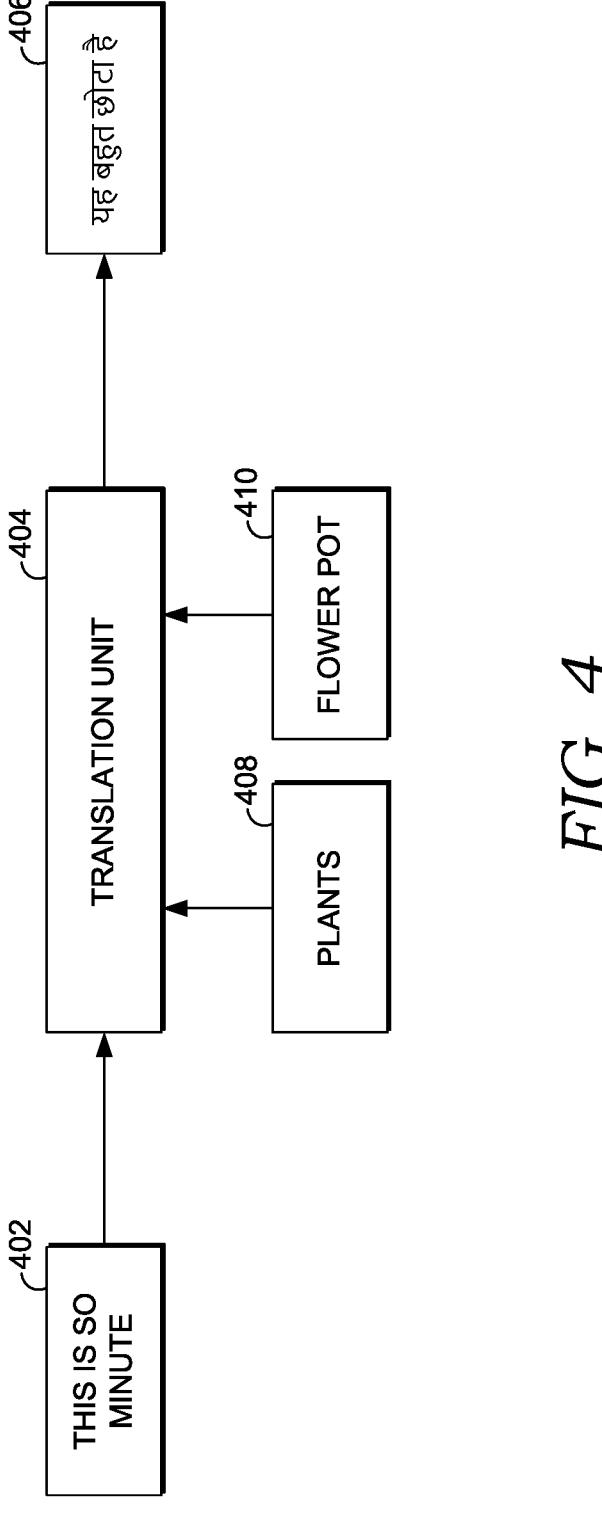
FIG. 4 is a diagram showing a specific example of review text in English being translation to translated review text in Hindi in accordance with some implementations of the present disclosure.

FIG. 4 provides a specific example of review text being translated from English to Hindi. As shown in FIG. 4, the input review text 402 states: "This is so minute." In addition to the input review text 402, a translation unit 404 receives keywords "plants" 408 and "flower pot" 410. In this example, the "plant" keyword 408 has been identified from text on the item page outside of the input review text 402, and the "flower pot" keyword 410 has been identified by analyzing an image on the item page. For instance, the "plant" keyword 408 could be identified from a page title or a description of the item on the item page, and the "flower pot" keyword 410 could be identified from an image of the item on the item page. As shown in FIG. 4, the input review text 402 has been translated to Hindi to provide translated review text 406: "यह बहुत छोटा है." In this example, the word "minute" has been properly translated to "छोटा," which means small (e.g., as opposed to "मिनट," which refers to minute as a measure of time).

With reference again to FIG. 1, the translation system 104 also includes a user interface (UI) component 122 that provides one or more user interfaces for interacting with the translation system 104. For instance, the UI component 122 can provide user interfaces to a user device, such as the user device 102. The user device 102 can be any type of computing device, such as, for instance, a personal computer (PC), tablet computer, desktop computer, mobile device, or any other suitable device having one or more processors. As shown in FIG. 1, the user device 102 includes an application 108 for interacting with the translation system 104. The application 108 can be, for instance, a web browser or a dedicated application for providing functions, such as those described herein. Among other things, the application 108 can present the user interfaces provided by the UI component 122. Among other things, the user interfaces can provide user interface elements allowing a user to select to have review text translated and provide translated text in response to a user selection.

Example Methods for Context-Based Review Translation

Figure 5:
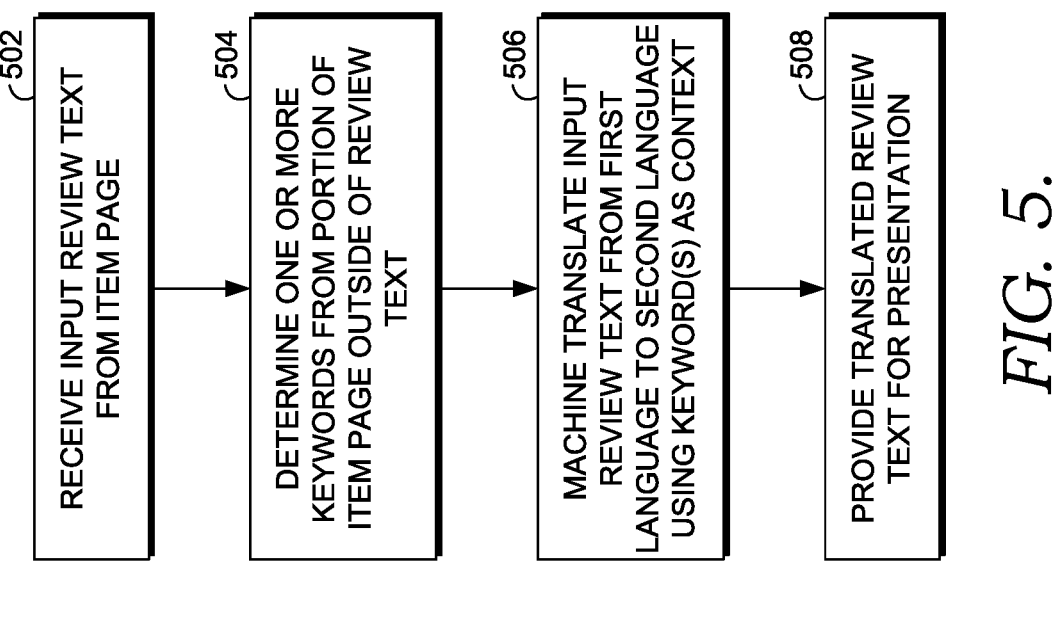
FIG. 5 is a flow diagram showing a method for translating review text on an item page from one language to another language using context from the item page outside of the review text in accordance with some implementations of the present disclosure.

With reference now to FIG. 5, a flow diagram is provided that illustrates a method 500 for translating review text on an item page from one language to another language using context from the item page outside of the review text. The method 500 can be performed, for instance, by the translation system 104 of FIG. 1. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 502, input review text from an item page is received. The input review text is in a first language. The input review text can be received for machine translation from the first language to a second language in a variety of different settings. For instance, in some cases, a system could automatically translate any review text submitted in a language other than the language of the item page to the language of the item page. In other instances, a system could automatically translate review text to a particular language based on a user's geolocation. In further instances, the input review text could be received in response to a user viewing the item page and selecting a user interface element requesting the input review text to be translated from the first language to a second language.

One or more keywords are determined from a portion of the item page outside of the review text, as shown at block 504. Keywords can be identified based on any portion of the item page outside of the review text being translated. For instance, keywords can be determined based on text of the item page beyond the review text being translated, images on the item page, and/or videos on the item page.

A machine translator translates the input review text from the first language to a second language, as shown at block 506. The machine translator uses the one or more keywords from block 504 as context for translating the input review text. Given the input review text and the one or more keywords, the machine translator generates a translated review text in the second language.

As shown at block 508, the translated review text is provided for presentation. For instance, the translated review text could be presented in a pop up box or presented as part of the item page (e.g., in place of the original review text in the first language).

Figure 6:
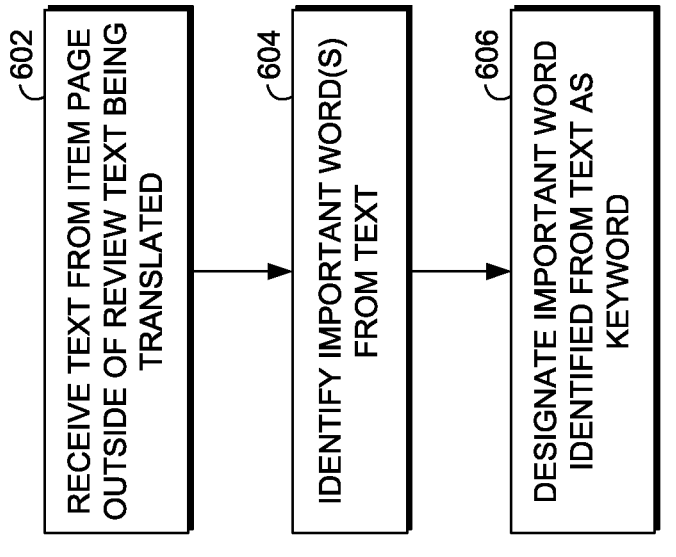
FIG. 6 is a flow diagram showing a method for identifying keywords from text of an item page in accordance with some implementations of the present disclosure.

Turning next to FIG. 6, a flow diagram is provided showing a method 600 for identifying keywords from text of an item page. As shown at block 602, text from an item page outside of review text being translated is received. The text can come from any portion of the item page beyond the review text being translated. For instance, the text can comprise an item/page title and/or an item description on the item page.

As shown at block 604, important words are identified from the text received at block 602. Important words can be identified from the text using a variety of different techniques, such as, for instance, TF-IDF scores, the RAKE (Rapid Automatic Keyword Extraction) algorithm, the TextRank algorithm, Support Vector Machines (SVM), Conditional Random Fields (CRF), deep neural networks, and other approaches. At least one of the important words identified at block 604 is designated as a keyword, as shown at block 606.

Figure 7:
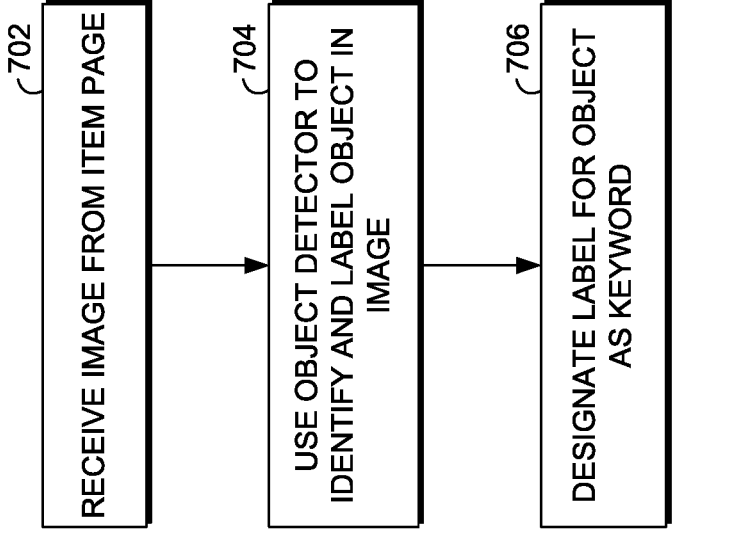
FIG. 7 is a flow diagram showing a method for identifying keywords from an image on an item page in accordance with some implementations of the present disclosure.

FIG. 7 provides a flow diagram illustrating a method 700 for identifying keywords from an image on an item page. As shown at block 702, an image from an item page is received. The image can be, for instance, an image of the item provided as part of a description of the item on the item page or can be an image otherwise included on the item page, (e.g., an image provided by a user as part of a review).

An object detector is used to analyze the image and identify an object in the image, as well as label the object, as shown at block 704. The object detector can classify the object as a particular object type and label the object based on the classification. The object detector can analyze an image using for instance, a machine learning-based LSTM-CNN (long short-term memory convolutional neural network) supervised model to identify and label objects in the image. Such a model can be trained using a set of images of labeled objects (e.g., the ImageNet dataset of images) and allows for additional training on images of further objects to allow the model to identify new objects. It should be noted that a LSTM-CNN model is provided by way of example only and not limitation and other object recognition techniques can be employed. As shown at block 706, the label for the object is designated as a keyword.

Figure 8:
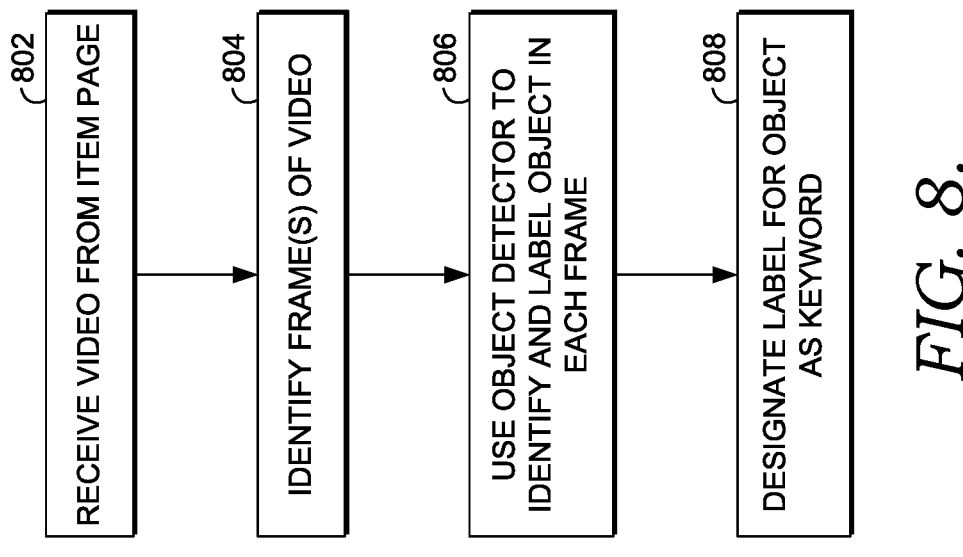
FIG. 8 is a flow diagram showing a method for identifying keywords from a video on an item page in accordance with some implementations of the present disclosure.

Turning next to FIG. 8, a flow diagram is provided showing a method 800 for identifying keywords from a video on an item page. As shown at block 802, a video from an item page is received. The video can be, for instance, a video regarding the item provided as part of a description of the item on the item page or a video otherwise included on the item page (e.g., a video provided by a user as part of a review).

One or more frames of the video are identified, as shown at block 804. The frame(s) can be identified, for instance, by extracting certain frames from the video by dividing the video into k sections of n seconds each and scanning through the frames in the video to select certain frames from buckets (i.e., groupings of frames) corresponding to scenes in the video.

An object detector is used to analyze each frame identified at block 804 and identify an object in each frame, as well as label each object, as shown at block 806. The object detector can classify the object as a particular object type and label the object based on the classification. The object detector can analyze an image using for instance, a machine learning-based LSTM-CNN (long short-term memory convolutional neural network) supervised model to identify and label objects in the image. Such a model can be trained using a set of images of labeled objects (e.g., the ImageNet dataset of images) and allows for additional training on images of further objects to allow the model to identify new objects. It should be noted that a LSTM-CNN model is provided by way of example only and not limitation and other object recognition techniques can be employed. As shown at block 808, the label for each object is designated as a keyword.

Exemplary Operating Environment

Figure 9:
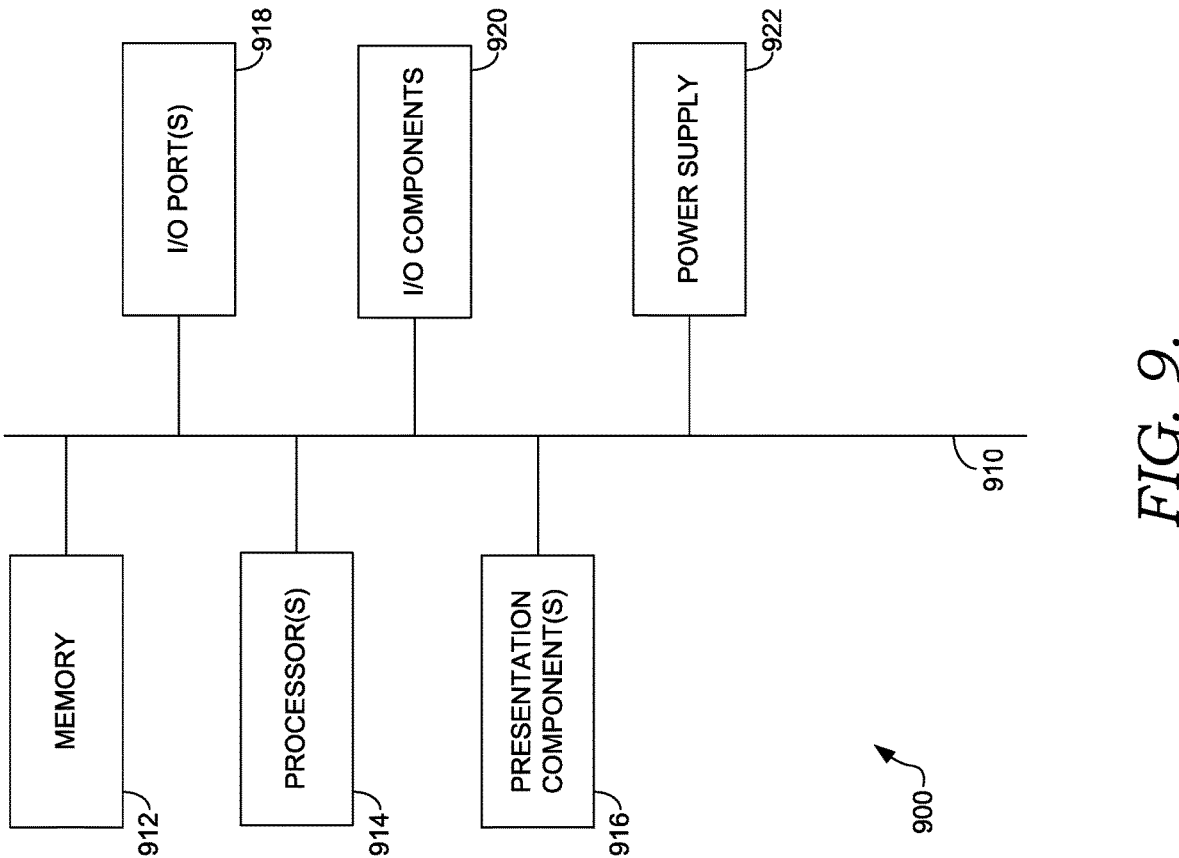
FIG. 9 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 9 in particular, an exemplary operating environment for implementing embodiments of the present technology is shown and designated generally as computing device 900. Computing device 900 is but one example of a suitable computing environment and is not intended to suggest any limitation as to the scope of use or functionality of the technology. Neither should the computing device 900 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what can be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. The memory can be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which can be built in. Illustrative components include a microphone, joystick, game pad, satellite dish, scanner, printer, wireless device, etc. The I/O components 920 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 900. The computing device 900 can be equipped with depth cameras, such as, stereoscopic camera systems, infrared camera systems, RGB camera systems, and combinations of these for gesture detection and recognition. Additionally, the computing device 900 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:

receiving review text from an item page for an item offered on a listing platform, the item page being a webpage from the listing platform that presents information describing the item and includes one or more user reviews of the item, the review text comprising a user review of the item in a first language;

determining one or more keywords describing the item from the information describing the item located on a portion of the item page outside of the review text, the information describing the item comprising one or more selected from the following: textual content describing the item, one or more images of the item, and one or more videos showing the item;

translating, by a machine translator, the review text from the first language to a second language using the one or more keywords describing the item as context to disambiguate one or more terms in the review text and improve translation accuracy when translating the review text to provide translated review text in the second language, the translated review text comprising the user review of the item in the second language; and providing the translated review text for presentation in association with the item page.

2. The computer storage media of claim 1, wherein determining the one or more keywords comprises:

accessing item page text outside of the review text; and identifying one or more important words from the item page text as the one or more keywords.

3. The computer storage media of claim 2, wherein the item page text comprises at least one selected from the following: an item title, and an item description.

4. The computer storage media of claim 2, wherein identifying the one or more important words from the item page text comprises:

computing a term frequency-inverse document frequency (TF-IDF) score for each word from a plurality of words from the item page text; and selecting one or more words having a TF-IDF score above a threshold as the one or more important words.

5. The computer storage media of claim 1, wherein determining the one or more keywords comprises:

accessing an image on the item page;

identifying, using an object detector, an object in the image and labeling the object with a label identifying the object; and selecting the label as one of the one or more keywords.

6. The computer storage media of claim 1, wherein determining the one or more keywords comprises:

accessing a video on the item page;

selecting a first frame from the video;

identifying, using an object detector, an object in the first frame and labeling the object with a label identifying the object; and selecting the label as one of the one or more keywords.

7. The computer storage media of claim 6, wherein selecting the first frame in the video comprises:

comparing features of the first frame to features of one or more other frames to determine the first frame and the one or more other frames correspond to a scene; and selecting the first frame as a representative frame for the scene.

8. The computer storage media of claim 1, wherein determining the one or more keywords comprises:

identifying a plurality of potential keywords from the information describing the item determining a relevance score for each potential keyword from the plurality of potential keywords; and selecting a first potential keyword as one of the one or more keywords based on the relevance score for the first potential keyword.

9. The computer storage media of claim 8, wherein determining the relevance score for the first potential keyword comprises computing a similarity between the first potential keyword and an item title for an item presented by the item page.

10. A computer-implemented method comprising:

receiving review text from an item page for an item offered on a listing platform, the item page being a webpage from the listing platform that presents information describing the item and includes one or more user reviews of the item, the review text comprising a user review of the item in a first language;

determining, by a text extractor, a first candidate set of one or more keywords describing the item from text on an item page outside of the review text to be translated;

determining, by an image extractor, a second candidate set of one or more keywords describing the item from an image of the item on the image page;

determining, by a video extractor, a third candidate set of one or more keywords describing the item from a frame of a video showing the item on the item page;

selecting, by a keyword selection component, a set of one or more keywords describing the item from the first candidate set, the second candidate set, and the third candidate set;

translating, by a machine translator, the review text from the first language to a second language using the set of one or more keywords describing the item as context to disambiguate one or more terms in the review text and improve translation accuracy when translating the review text to provide translated review text in the second language, the translated review text comprising the user review of the item in the second language; and providing, via a user interface component, the translated review text for presentation in association with the item page.

11. The method of claim 10, wherein the text extractor determines the first candidate set of one or more keywords by:

identifying one or more important words from the text on the item page outside of the review text as one or more candidate keywords.

12. The method of claim 11, wherein the one or more important words are identified based on a term frequency-inverse document frequency (TF-IDF) score determined for each word from a plurality of words from the text from the item page outside of the review text.

13. The method of claim 10, wherein the image extractor determines the second candidate set of one or more keywords by:

identifying, using an object detector, an object in the image and labeling the object with a label identifying the object; and selecting the label as a candidate keyword.

14. The method of claim 10, wherein the video extractor determines the third set of one or more keywords by:

selecting a first frame from the video;

identifying, using an object detector, an object in the first frame and labeling the object with a label identifying the object; and selecting the label as a candidate keyword.

15. The method of claim 10, wherein the keyword selector selects the set of one or more keywords by:

determining a relevance score for each keyword from the first candidate set, the second candidate set, and the third candidate set; and selecting a first keyword as one of the one or more keywords based on the relevance score for the first keyword.

16. A computer system comprising:

a processor; and a computer storage medium storing computer-useable instructions that, when used by the processor, causes the computer system to perform operations comprising:

receiving review text from an item page for an item offered on a listing platform, the item page being a webpage from the listing platform that presents information describing the item and includes one or more user reviews of the item, the review text comprising a user review of the item in a first language;

determining, by a keyword component, one or more keywords describing the item from text describing the item on the item page outside of the review text to be translated, an image of the item on the item page, and/or a video showing the item on the item page;

translating, by a machine translator, the review text from the first language to a second language using the one or more keywords describing the item as context to disambiguate one or more terms in the review text and improve translation accuracy when translating the review text from the first language to a translated review text in the second language, the translated review text comprising the user review of the item in the second language; and providing, via a user interface component, the translated review text for presentation in association with the item page.

17. The system of claim 16, wherein determining the one or more keywords comprises:

accessing item page text outside of the review text; and identifying one or more important words from the item page text as the one or more keywords.

18. The system of claim 16, wherein determining the one or more keywords comprises:

accessing an image on the item page;

identifying, using an object detector, an object in the image and labeling the object with a label identifying the object; and selecting the label as one of the one or more keywords.

19. The system of claim 16, wherein determining the one or more keywords comprises:

accessing a video on the item page;

selecting a first frame from the video;

identifying, using an object detector, an object in the first frame and labeling the object with a label identifying the object; and selecting the label as one of the one or more keywords.

20. The system of claim 16, wherein determining the one or more keywords comprises:

identifying a plurality of potential keywords from the item page outside of the review text;

determining a relevance score for each potential keyword from the plurality of potential keywords; and selecting a first potential keyword as one of the one or more keywords based on the relevance score for the first potential keyword.

\* \* \* \* \*